Sept. 8, 1959                E. WEIL              2,902,702

COMBINED BRUSHING SPONGE AND MIRROR

Filed Sept. 6, 1956

INVENTOR.

Edward Weil

United States Patent Office 2,902,702
Patented Sept. 8, 1959

2,902,702

COMBINED BRUSHING SPONGE AND MIRROR

Edward Weil, Leonia, N.J.

Application September 6, 1956, Serial No. 608,244

1 Claim. (Cl. 15—118)

This invention relates to an improved device for brushing clothes and garments and includes a resilient rubber sponge, a backing plate of mirror reflective properties bonded to the side of the sponge, and a flexible handle secured between the backing plate and the sponge, so that the sponge may be secured in the hand and used when so secured for brushing service, or the device held in the hand to permit the back plate or mirror to be used for viewing the face or head of the user, the backing plate being extended to the sides of the resilient rubber sponge so that it forms a stiffening element therefor, and enables the user to establish a firmer grip on the sponge and to apply the sponge more vigorously in brushing service.

With the above and other objects in view the invention relates to certain new and useful constructions, combinations and arrangements of parts, clearly described in the following specification and shown in the accompanying drawings, in which.

Figure 1:
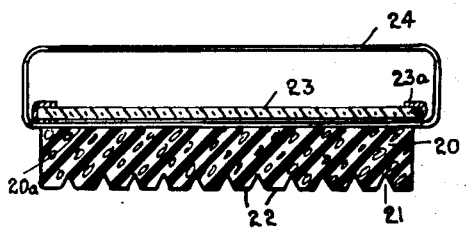
Fig. 1 is a central cross sectional view, showing the flexible handle disposed above the backing mirror plate, so that the sponge may be used for brushing service.

Referring to the drawings, 20 designates a resilient rubber sponge, or a sponge or equal material, having a brushing face formed with transverse grooves 21, which provide parallel brushing ribs 22, spaced apart by said grooves 21.

Against the reverse or rear side of this sponge a backing plate 23, having a high reflecting surface, is bonded by cement or adhesive, so that the user may view his or her face by looking into the mirror backing plate.

A flexible handle strap 24 is secured by its inner run or length between the backing plate mirror 23 and the sponge 20, and provides an open handle loop, through which the hand of the user may be freely extended to grip the sponge and the edge of the backing mirror. To protect the hand of the user the mirror, especially when made of glass or plastic, may be provided with an edging 23a, folded around the edge of the mirror, which is extended slightly beyond the edge of the sponge, to limit the compression of the sponge and provide a better hand grip for the device.

By swinging the flexible handle strap from a position opposite to the mirror backing plate to a position opposite to the brushing ribs of the sponge, the mirror may be securely held in the hand for face or head viewing.

Figure 2:
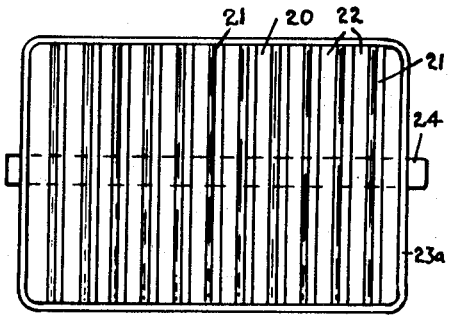
Fig. 2 is a bottom plan view thereof.
Figure 3:
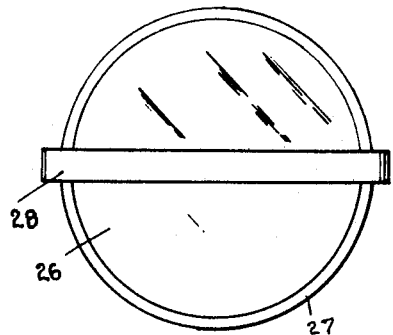
Fig. 3 is a plan view of a modified form of the device, showing the mirror backing plate and handle.
Figure 4:
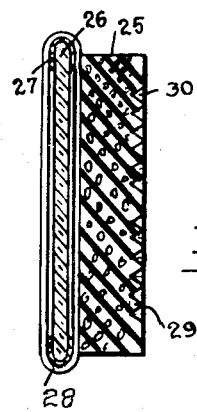
Fig. 4 is a central sectional view of the form shown in Fig. 3.
Figure 5:
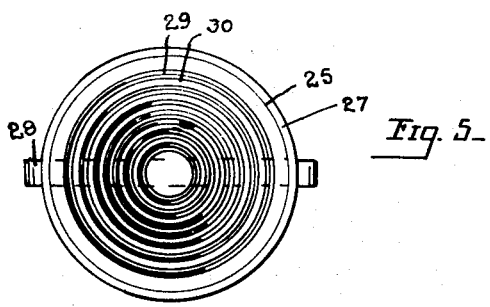
Fig. 5 is a plan view, showing the service face of the sponge brush of Figs. 3 and 4, taken on a reduced scale.

Figs. 1 and 2 showing a rectangular or oblong form of the sponge and backing plate, is one shape of the device, and Figs. 3, 4 and 5, showing a circular sponge and backing plate, is another shape of the device. In the circular form, the resilient rubber sponge is indicated at 25, the brushing ribs at 29, and the grooves at 30. A circular mirror backing plate 26 is bonded to the reverse or back side of the circular sponge, and the edge of this mirror is protected by a folded metal or other binding 27. An endless flexible strap 28 is secured between this circular mirror backing plate and the circular sponge, and may be arranged as shown in Figs. 3, 4 and 5, so that the sponge may be used for brushing, or reversed, so that the mirror may be used for viewing.

In both forms the grooves provide shallow pockets into which flint and threads may be brushed, and the ribs provide greater flexibility in brushing for the working face of the sponge, which is constructed of soft and highly resilient, and yieldable, rubber or other similar material.

Having described my invention, I claim as patentable:

A combined sponge and mirror, comprising a circular sponge of compressible material having on one side face thereof a series of concentric ridges and grooves between the ridges and an opposite flat side face, a circular mirror larger than the sponge disposed against said opposite side face and bonded thereto and having its reflecting face exposed for personal viewing, the outer edge portion of the mirror extending outwardly of the sponge to provide a hand grip, and a flexible handle loop having an inner portion secured between the sponge and the mirror and an outer portion spaced outwardly to provide a closed handle loop, the handle loop being usable with the outer portion thereof disposed in confronting relation to the mirror so that user can apply the sponge ridges against material to be brushed and being reversible so that the outer portion of the handle loop may be disposed in confronting relation to the said ridges to permit the use of the reflecting face of the mirror for personal viewing.

References Cited in the file of this patent

UNITED STATES PATENTS

| | | |
|---|---|---|
| 781,369 | Scott | Jan. 31, 1905 |
| 1,193,223 | Beckmann | Aug. 1, 1916 |
| 1,421,311 | Rope | June 7, 1922 |
| 1,449,856 | Hamspon | Mar. 27, 1923 |
| 1,453,249 | Rope | Apr. 24, 1923 |
| 2,249,912 | Oxley | July 22, 1941 |
| 2,341,818 | Schellings | Feb. 15, 1944 |

FOREIGN PATENTS

| | | |
|---|---|---|
| 466,645 | Great Britain | June 1, 1937 |
| 672,951 | France | Sept. 24, 1929 |
| 1,094,497 | France | Dec. 8, 1954 |